United States Patent
Evans et al.

(10) Patent No.: US 6,774,864 B2
(45) Date of Patent: Aug. 10, 2004

(54) METHOD OF OPERATING A WIRELESS COMMUNICATION SYSTEM

(75) Inventors: David H. Evans, Crawley (GB); Bhavin S. Khatri, London (GB); Deborah L. Raynes, Horley (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/247,927

(22) Filed: Sep. 20, 2002

(65) Prior Publication Data

US 2003/0083016 A1 May 1, 2003

(30) Foreign Application Priority Data

Oct. 19, 2001 (GB) .............................................. 0125178

(51) Int. Cl.[7] .............................................. H01Q 21/00
(52) U.S. Cl. ..................... 343/853; 343/703; 455/67.1; 455/562
(58) Field of Search ................................ 343/703, 853; 455/67.1, 450, 561, 562, 722

(56) References Cited

U.S. PATENT DOCUMENTS

| | | | | |
|---|---|---|---|---|
| 5,260,820 A | * | 11/1993 | Bull et al. ................... | 398/125 |
| 6,047,019 A | * | 4/2000 | Ishii ........................... | 375/148 |
| 6,075,997 A | * | 6/2000 | Lindqvist et al. ........... | 455/561 |
| 6,600,934 B1 | * | 7/2003 | Yun et al. .................... | 455/101 |
| 2002/0115452 A1 | * | 8/2002 | Whikehart et al. ......... | 455/456 |

* cited by examiner

*Primary Examiner*—Tho Phan
(74) *Attorney, Agent, or Firm*—Gregory L. Thorne

(57) ABSTRACT

A method of selecting a combination of transmit antennas (TA1 to TA4) and receive antennas (RA1 to RA4) in a MIMO antenna system to give the best isolation from adjacent parallel signal streams comprises transmitting a first signal from one of the transmit antennas and measuring a quality metric, for example signal strength of the received signal at each of the receive antennas. The process is repeated using signals transmitted in turn by each the remaining transmit antennas. A channel matrix is compiled of the transmit antennas versus the receive antennas and a selection is made of a combination of transmit and receive antennas receiving acceptably a first signal and unacceptably a second signal and vice versa. The selected combination is used to send and receive MIMO signals.

Figure 1:
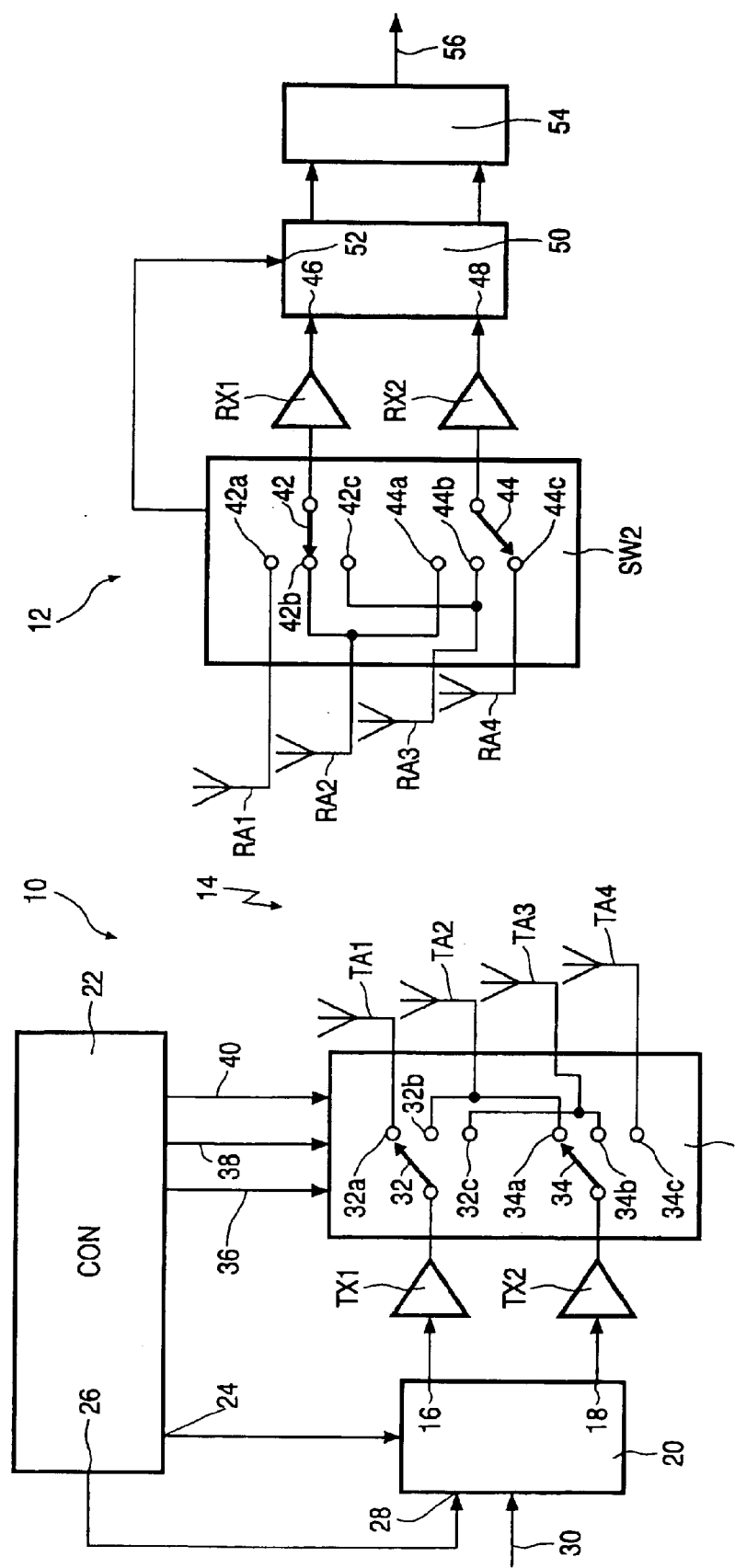

Switches (SW1, SW2) are provided for coupling the selected antennas to the respective transmitters (TX1, TX2) and receivers (RX1, RX2).

12 Claims, 2 Drawing Sheets

METHOD OF OPERATING A WIRELESS COMMUNICATION SYSTEM

The present invention relates to a method of operating a wireless communication system and particularly, but not exclusively, to a method of adapting the wireless communication system to give good isolation from adjacent parallel signal streams.

A multiple input multiple output (MIMO) antenna system relies on transmitting a set of individual data streams on the same radio frequency from a set of "m" radio transmitters and receiving these data streams with a set of "n" radio receivers, each radio transmitter and receiver having its own antenna. The MIMO antenna system relies on having a propagation environment that is rich with scatterers such that each receive antenna obtains a substantially different set of signals from the transmitter. In order to assist further the process of separating the received signals $n \geq m$. The technique can be used either to increase the robustness of a radio connection or to increase the capacity of the radio channel. Under ideal conditions a capacity increase of m may be possible.

Despite the simple requirements described, a MIMO antenna system requires complex signal processing. Two processes need to be performed, namely, the determination of the scattering matrix of the channel and the separation of the individual data streams. Furthermore, if the system is operating in not so ideal conditions some of the n receivers may not be contributing much to the detection process and hence represent a level of potentially expensive redundancy.

An object of the present invention is to operate a wireless communication system more effectively.

According to a first aspect of the present invention there is provided a method of selecting a combination of transmit antennas and receive antennas in a MIMO antenna system, comprising transmitting a first signal from a first of m transmit antennas, measuring a quality metric of the first signal as received at each of a plurality of n receive antennas, repeating the process using the remaining m−1 transmit antennas to respectively transmit signals, and determining those combinations of transmit and receive antennas receiving acceptably a first signal and unacceptably a second signal and vice versa.

According to a second aspect of the present invention there is provided a method of operating a MIMO antenna system comprising a transmitter having at least two transmitters and a plurality of transmit antennas and and at least one receiving station having at least two receivers and a plurality of receive antennas, the method comprising transmitting a signal from a first of the plurality of the transmit antennas and determining a quality metric of the signal received by each of the plurality of the receive antennas, repeating the said operations using each of the remaining transmit antennas respectively, forming a channel matrix of the performances of the plurality of the transmit antennas versus the plurality of the receive antennas and selecting from the channel matrix a combination of at least two of the transmit antennas and at least two of the receive antennas in which a signal from at least one of the transmit antennas is acceptable at at least one of the receive antennas and unacceptable at the remainder of the receive antenna(s) and vice versa in respect of a signal from the remainder of the transmit antenna(s).

According to a third aspect of the present invention there is provided a MIMO antenna system comprising a transmitter station having at least two transmitters and a plurality of transmit antennas and and at least one receiving station having at least two receivers and a plurality of receive antennas, the transmitting station having means for sequentially selecting one of the transmit antennas and transmitting a signal from the selected transmit antenna, the receiving station having means for sequentially selecting one of the plurality of the receive antennas and means for determining a quality metric of a signal received by each of the plurality of the receive antennas, the system further comprising means for forming a channel matrix of the performances of the transmit antennas versus the receive antennas and for selecting from the channel matrix a combination of at least two of the transmit antennas and at least two of the receive antennas in which a signal from at least one of the selected transmit antennas is acceptable at at least one of the selected receive antennas and unacceptable at the remainder of the selected receive antenna(s) and vice versa in respect of a signal from the remainder of the selected transmit antenna(s).

By having more antennas than either receivers or transmitters gives the system plenty of freedom to select the best antenna combination such that the individual transmitter data streams can be received at those antennas that give the best isolation from adjacent parallel signal streams. Antenna redundancy can be practised with performance enhancements.

In implementing the method in accordance with the present invention the strength of the signals received by each of the receiver antennas from each of the transmitter antennas is measured using a simple antenna diversity selection process and a determination is made of the antennas which offer the strongest (or acceptable) reception as well as those that offer the weakest (or unacceptable) reception.

Figure 2:
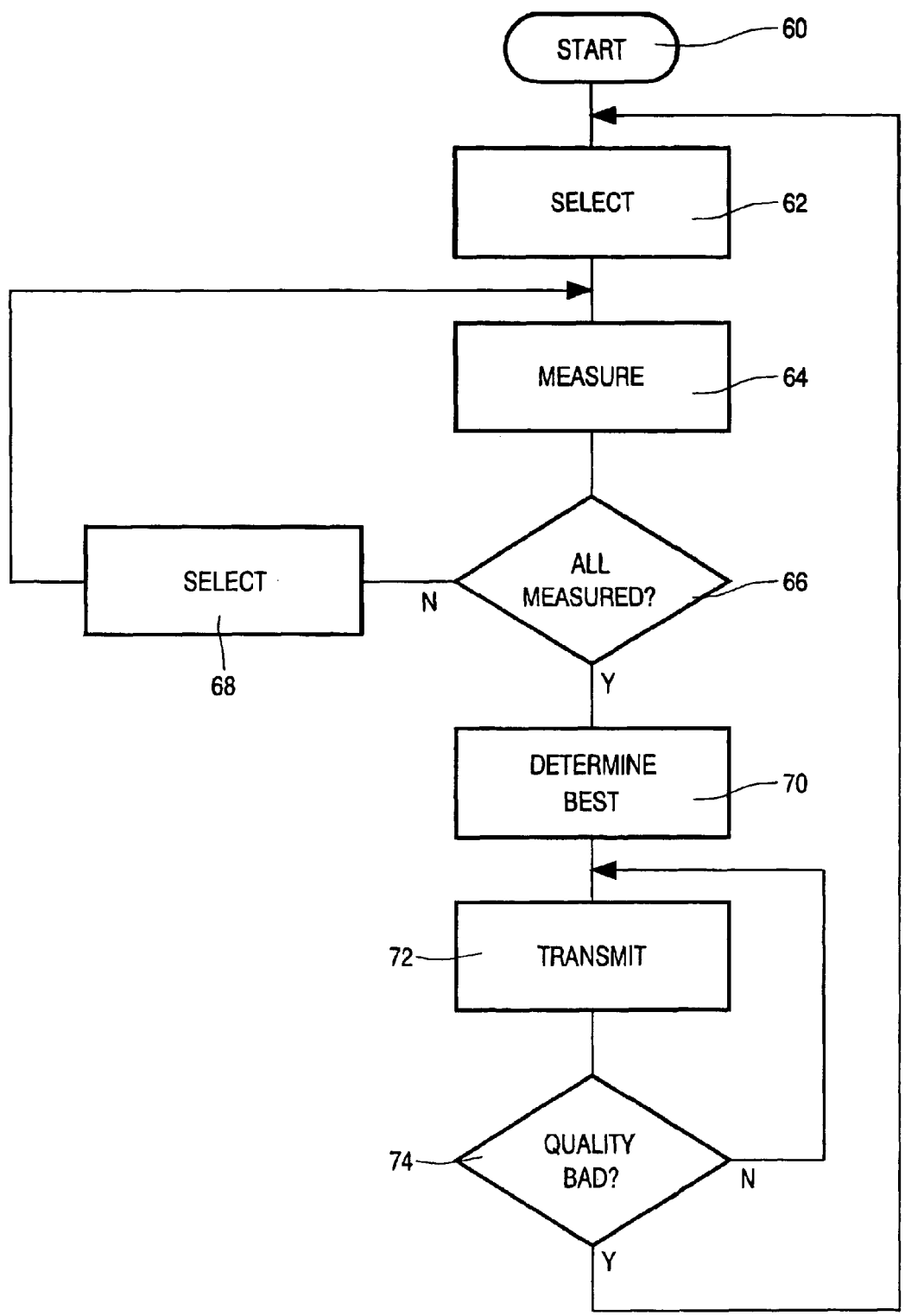

The present invention will now be described, by way of example, with reference to the accompanying drawings, wherein:

FIG. 1 is a block schematic diagram of an embodiment of a simplified MIMO wireless communication system, and FIG. 2 is a simplified flow chart of the antenna selection process.

In the drawings the same reference numerals have been used to indicate corresponding features.

The MIMO wireless communication system shown in FIG. 1 comprises a transmitting station 10 and a receiving station 12 which are separated by a multipath environment 14. In practice there may be two or more receiving stations.

The transmitting station 10 comprises two transmitters TX1, TX2 having inputs which are coupled to respective outputs 16, 18 of a data demultiplexer 20. A controller (CON) 22 has an output 24 for control signals to be supplied to the demultiplexer 20 and output 26 for a training sequence to be supplied to an input 28 of the demultiplexer 20. Data signals are applied to an input 30 of the demultiplexer 20 which provides respective data substreams on its outputs 16, 18. Four antennas TA1, TA2, TA3 and TA4 are coupled to the transmitters TX1, TX2 by way of a switching unit SW1. The switching unit SW1 comprises two 3-way, single pole RF switches 32, 34 having output contacts 32a to 32c, 34a to 34b, respectively, or a single three way, two pole RF switch. The output contact 32a is connected to the antenna TA1. Output contacts 32b and 34a are ganged together and are connected to the antenna TA2. Output contacts 32c and 34b are ganged together and are connected to the antenna TA3. Finally, the output contact 34c is connected to the antenna TA4. The switches are controlled by signals on outputs 36, 38, 40 of the controller 22. The control signals provided by the controller 22 enable a training sequence on the input 28 of the demultiplexer 20 to be transmitted by the transmitter TX1 or TX2 or for data bits, bytes or packets to be selected for alternate transmission by the transmitters TX1 and TX2.

The receiving station 12 comprises four antennas RA1, RA2, RA3 and RA4 which are coupled by a switching unit SW2 to receivers RX1, RX2 which recover respective data substreams from the received signals. The switching unit SW2 comprises two 3-way, single pole RF switches 42, 44 having contacts 42a to 42c and 44a to 44c, respectively, or a single 3-way, two pole RF switch. The antennas RA1 and RA4 are connected to respective contacts 42a and 44c. Contacts 42b and 44a are ganged together and are connected to the antenna RA2. Finally, contacts 42c and 44b are ganged together and are connected to the antenna RA3. The outputs of the switches 42, 44 are coupled respectively to the receivers RX1, RX2.

The data substreams from the receivers RX1, RX2 are coupled to respective inputs 46, 48 of a simplified MIMO processing and switch control stage 50. The stage 50 has an output 52 for switch control signals to be applied to the switching unit SW2. The stage 50 also includes conventional MIMO processing and supplies data substreams to respective inputs of a data multiplexer 54 which provides a single data stream on an output 56.

The method in accordance with the present invention requires the transmitting and receiving stations 10, 12 to determine the quality, for example received signal strengths, of the signals transmitted by each of the antennas TA1 to TA4 and received by each of the antennas RA1 to RA4 after transmission through the multipath environment 14 which may having varying characteristics due to factors such as the transmitting station 10 and/or the receiving station 12 moving and/or an obstruction affecting temporarily the propagation characteristics of a selected radio channel or channels.

The embodiment illustrated in FIG. 1 uses four transmit antennas TA1 to TA4 and four receive antennas RA1 to RA4. However other numbers may be used. As a general guide there are "m" transmit antennas and "n" receive antennas, where $m \geq 2$ and n>m. In the present example a subset of two transmit and two receive antennas are selected and the best use of this subset is made whilst retaining the advantages of MIMO. The switching unit SW1 enables each of the transmitters TX1, TX2 to be connected to one of three of the group of four antennas TA1 to TA4 and between them any pair of antennas can be selected. The switching unit SW2 enables a similar objective to be achieved in the receiving station. However it should be understood that a combination of a greater number than 2 transmit and receive antennas can be chosen. Further the numbers of transmit and receive antennas exceed, respectively, the numbers of transmitters and receivers, the switching units SW1, SW2 enabling the outputs/inputs of the transmitters/receivers to be applied to a greater number of antennas.

The antenna selection process involves a received signal strength estimation in the manner that is used in antenna diversity. Since only the signal strengths need to be determined the channel estimating process can use a simple signal, for example the training sequence which is applied to the input 28 of the demultiplexer 20 or a short part of a synchronisation sequence.

For the first transmit antenna TA1 a simple signal is transmitted and the strength of the signals received by each of the receive antennas RA1 to RA4 is measured. In practice it is likely that a range of signal strengths will be detected. The process is repeated with a simple signal transmitted by the second transmit antenna TA2. Again a range of signal strengths is likely to be detected with the range of signal strengths being in a different order across the receive antennas RA1 to RA4. An assumption is made is that for a certain antenna spacing, typically>$\lambda$/2, the signal strength that is received at one of the receive antennas will be significantly different to that which is received on is another of the receive antennas and the same applies to a pair of transmit antennas when viewed at the receiver.

This process is repeated for each one of the remaining transmit antennas so that a complete measure of the channel is obtained. In carrying out the measuring process the objective is to ascertain which of the antennas is receiving the weakest signals when compared against the strongest signals.

By selecting a subset of two transmit antennas and two receive antennas, it is likely that a combination of transmit and receive antennas can be chosen such that good isolation can be obtained at the receivers between the individual transmitter signals. An example of a typical channel matrix is given below, only the relative signal amplitudes are considered:

|  | RX1 | RX2 | RX3 | RX4 |
|---|---|---|---|---|
| TX1 | 1 | 0.33 | 0.1 | 0.33 |
| TX2 | 0.33 | 0.1 | 1 | 1 |
| TX3 | 0.1 | 1 | 0.33 | 0.1 |
| TX4 | 0.33 | 0.33 | 1 | 0.1 |

Inspecting the channel matrix shows that from the antenna TX2 a good signal is received at the antenna RX4 and a very weak signal is received at the antenna RX2. From the antenna TX3 the converse is seen, a good signal is received at the antenna RX2 and a weak signal is received at the antenna RX4. This subset of transmit and receive antennas therefore gives very good reception and channel isolation such that the signal transmitted from the antenna TX2 is received in a: distinct manner at the antenna RX4 but is received weakly at the antenna RX2 and the signal from antenna TX3 is received in a distinct manner at the antenna RX2 but is received weakly at the antenna RX4. Thus by selecting suitable antenna pairs or combinations no additional processing is required to separate the MIMO signals. In this case the MIMO is 2 in and 2 out and a capacity increase of 2 is potentially possible. In the event of the selection being carried out by the receiving station 12 the identities of the selected transmit antennas is communicated on a radio uplink (not shown) to the controller 22.

The operations involved are summarised by the flow chart shown in FIG. 2. Block 60 indicates the start of the process. Block 62 denotes the operations of the controller 22 randomly selecting a transmit antenna TA1, TA2, TA3 or TA4 from the group and by using the demultiplexer 20, the transmitters TX1, TX2 and the switching unit SW1, a training sequence is transmitted by way of the selected transmit antenna. Block 64 denotes the process of the the receiving station 12 using the switching unit SW2, the receivers RX1, RX2 and the switch control stage 50 to measure the signal strength on the receive antennas RA1 to RA4 and determine which of these antennas has received the strongest signal and which has received the weakest signal from a selected one of the transmitters. Optionally if it is possible, determine other quality metrics for the received signals such as bit error rate (BER), as these may also help with the antenna selection decision process.

Block 66 denotes checking if all the transmit antennas have been measured. If no (N) then the process proceeds to block 68 but if yes (Y) the process proceeds to block 70. Block 68 relates to randomly selecting another antenna other than the one(s) previously selected. Using the demultiplexer 20, the transmitters TX1, TX2 and the switching unit SW1 transmits a training sequence by way of the selected antenna and the process represented by the block 64 is repeated. The block 70 denotes determining from the measurements which two pairs of transmit and receive antennas can uniquely and independently transmit to one another such that one receive antenna can receive a strong (or acceptable) signal from the first transmit antenna and a weak (or unacceptable) signal from the second transmit antenna and the second receive antenna can receive a good signal from the second transmit antenna and a weak signal from the first transmit antenna.

Block 72 relates to proceeding with the transmission of data for a certain duration.

Block 74 relates to checking if the signal quality is bad. If it is not (N) then the process of monitoring the received signal quality at both of the receive antennas continues. If the signal is bad (Y) then the process steps denoted by the blocks 62 to 72 are followed. It may be advantageous to start with the two previously selected transmit antennas.

In a variant of the process described with reference to the flow chart shown in FIG. 2 which will reduce the search for the best pair of antennas, in the block 66 an initial test is made to see if the currently measured transmit antennas (of which there must be at least two) can give the required performance. If this variant is adopted then the process denoted by the block 70 is changed by checking if any of the selected transmit antennas can be uniquely and independently received by the receive antennas such that one receive antenna can receive a strong (or acceptable) signal from the first transmit antenna and a weak (or unacceptable) signal from the second transmit antenna and a second receive antenna receives a strong (or acceptable) signal from the second transmit antenna and a weak (or unacceptable) signal from the first transmit antenna. If the check is positive then use this pair of transmit antennas and this pair of receive antennas. This obviates the need to repeat the measurement for all the transmit antennas. The flow chart now continues with the block 72. However if the check is negative then repeat the process steps 68 and 64 for another transmit antenna (unless all the transmit antennas have been used) and repeat the variant of the flow chart mentioned above. In the event of all of the transmit antennas having been measured then the flow chart continues with the process step indicated by the block 70, namely determining the best antenna pair.

The method in accordance with the present invention can be extended to cover combinations of greater than pairs of transmit and receive antennas. For example it is possible to have triplets comprising one strong (or acceptable) signal and two very weak (or unacceptable) signals with the strong signal in one triplet being one of the very weak signals in the other two triplets. In the case of a greater number of transmit and receive antennas, there may not always be a clear distinction between strong and very weak and it might be that a judgement has to be made on the basis of acceptable and unacceptable criteria.

In the present specification and claims the word "a" or "an" preceding an element does not exclude the presence of a plurality of such elements. Further, the word "comprising" does not exclude the presence of other elements or steps than those listed.

From reading the present disclosure, other modifications will be apparent to persons skilled in the art. Such modifications may involve other features which are already known in the design, manufacture and use of MIMO antenna systems and component parts therefor and which may be used instead of or in addition to features already described herein.

What is claimed is:

1. A method of selecting a combination of transmit antennas and receive antennas in a MIMO antenna system, comprising transmitting a first signal from a first of m transmit antennas, measuring a quality metric of the first signal as received at each of a plurality of n receive antennas, repeating the process using the remaining m−1 transmit antennas to respectively transmit signals, and determining a pair of transmit and receive antennas receiving acceptably a first signal and unacceptably a second signal and vice versa.

2. A method of operating a MIMO antenna system comprising a transmitting station having at least two transmitters and a plurality of transmit antennas and and at least one receiving station having at least two receivers and a plurality of receive antennas, the method comprising transmitting a signal from a first of the plurality of the transmit antennas and determining a quality metric of the signal received by each of the plurality of the receive antennas, repeating the transmitting using at least one other of the remaining transmit antennas respectively, forming a channel matrix of the performances of the plurality of the transmit antennas versus the plurality of the receive antennas and selecting from the channel matrix a combination of at least two of the transmit antennas and at least two of the receive antennas in which a signal from at least one of the transmit antennas is acceptable to at least one of the receive antennas and unacceptable at the remainder of the receive antenna(s) and vice versa in respect of a signal from the remainder of the transmit antenna(s).

3. A method as claimed in claim 2, characterised in that the quality metric determined is signal strength.

4. A method as claimed in claim 3, characterised in that a strongest signal is acceptable and a weakest signal is unacceptable, respectively.

5. A method as claimed in claim 2, characterised by monitoring the performance of a selected pair of transmit and receive antennas and in response to their performance becoming unacceptable, making an assessment of the relative performance of the transmit and receive antennas.

6. A method as claimed in claim 2, characterised by monitoring the performance of a selected pair of transmit and receive antennas and in response to their performance becoming unacceptable, making an assessment of the relative performance of the transmit and receive antennas commencing with the previously selected transmit antennas.

7. A method as claimed in claim 2, characterised in that the transmitted signals comprise training and/or synchronisation sequences.

8. A MIMO antenna system comprising a transmitter station having at least two transmitters and a plurality of transmit antennas and at least one receiving station having at least two receivers and a plurality of receive antennas, the transmitting station having means for sequentially selecting one of the transmit antennas and transmitting a signal from the selected transmit antenna, the receiving station having means for sequentially selecting one of the plurality of the receive antennas and means for determining a quality metric of a signal received by each of the plurality of the receive antennas, the system further comprising means for forming a channel matrix of the performaces of the transmit antennas versus the receive antennas and for selecting from the channel matrix a combination of at least two of the transmit antennas and at least two of the receive antennas in which a signal from at least one of the selected transmit antennas is acceptable to at least one of the selected receive antennas and is unacceptable to at least one of the selected receive antenna(s) and vice versa in respect of a signal from at least one other of the selected transmit antenna(s).

9. A system as claimed in claim 8, characterised by the transmitter station having less transmitters than the number of transmit antennas.

10. A system as claimed in claim 8, characterised by the receiving station having less receivers than the number of receive antennas.

11. A transmitting station for use in the MIMO antenna system as claimed in claim 8.

12. A receiving station for use in the MIMO antenna system as claimed in claim 8.

* * * * *